(12) United States Patent
Gaertner et al.

(10) Patent No.: US 6,170,042 B1
(45) Date of Patent: Jan. 2, 2001

(54) DISC DRIVE DATA STORAGE SYSTEM AND METHOD FOR DYNAMICALLY SCHEDULING QUEUED COMMANDS

(75) Inventors: Mark A. Gaertner, Woodbury, MN (US); Mark A. Heath; David C. Pruett, both of Oklahoma City, OK (US)

(73) Assignee: Seagate Technology LLC

( * ) Notice: Under 35 U.S.C. 154(b), the term of this patent shall be extended for 0 days.

(21) Appl. No.: 09/044,271

(22) Filed: Mar. 19, 1998

Related U.S. Application Data

(60) Provisional application No. 60/075,721, filed on Feb. 24, 1998.

(51) Int. Cl.[7] ............... G06F 13/00; G06F 7/00
(52) U.S. Cl. ............... 711/158; 711/112; 710/5; 710/6; 710/39; 710/54; 709/103
(58) Field of Search ................. 711/167, 158, 711/112, 114; 710/52, 54, 39, 40, 5, 6; 369/32, 34

(56) References Cited

U.S. PATENT DOCUMENTS

| | | | |
|---|---|---|---|
| 5,220,653 | * 6/1993 | Miro | 709/107 |
| 5,561,456 | * 10/1996 | Yu | 348/7 |
| 5,570,332 | 10/1996 | Heath et al. | 369/50 |
| 5,687,390 | * 11/1997 | McMillan, Jr. | 710/5 |
| 5,802,394 | * 9/1998 | Baird et al. | 710/5 |

* cited by examiner

Primary Examiner—Glenn Gossage
(74) Attorney, Agent, or Firm—Westman, Champlin & Kelly, P.A.

(57) ABSTRACT

A data storage system and method of scheduling commands in such a data storage system are provided in which commands are stored in a command sort queue and a scheduled command queue. Commands in the command sort queue are sorted and assigned a priority. Eventually, commands in the command sort queue are transferred to the scheduled command queue. Commands in the scheduled command queue are executed without further sorting. The desired queue depth or size of the scheduled command queue is determined as a function of both the queue depth of the command sort queue and a command execution rate value which is indicative of the rate at which commands in the scheduled command queue are executed. The desired queue depth may be dynamically determined using the queue depth of the command sort queue and the command execution rate value as inputs to a look-up table. The data storage system may include a small computer system interface (SCSI) disc (or "disk") drive which executes commands from a host system.

16 Claims, 3 Drawing Sheets

DISC DRIVE DATA STORAGE SYSTEM AND METHOD FOR DYNAMICALLY SCHEDULING QUEUED COMMANDS

The present application claims the benefit of earlier filed U.S. Provisional Application No. 60/075,721, entitled DYNAMIC SCHEDULING TECHNIQUE TO IMPROVE PERFORMANCE OF DISC DRIVE, filed on Feb. 24, 1998.

BACKGROUND OF THE INVENTION

The present invention relates generally to data storage systems. More particularly, the present invention relates to methods of sorting and scheduling commands, and data storage systems utilizing the same, in order to minimize command sorting delay times and to enhance system performance.

Computers and other types of host systems read and write data to data storage devices such as disc (or "disk") drives. The process of reading data from or writing data to a specific media location is initiated by the host system or device which issues a command across a bus using a defined protocol. Some interface protocols, such as the small computer system interface (SCSI) protocol, allow multiple commands to be queued at the disc drive. In other words, a read or write command can be issued to the disc drive and placed in queue without having to wait for the execution of any outstanding commands to be completed.

Typically, disc drives are adapted to execute the commands in an order which is deemed most appropriate based upon the types of commands in the queue. Intelligent disc controller firmware sorts the commands, using any of a variety of different sorting algorithms, in order to reduce mechanical delays within the drive. Mechanical delays include the times required to seek, to spin to the beginning of a block of data, and to transfer the data associated with the command. Proper sorting of queued commands can dramatically improve the performance of a disc drive data storage system by reducing these mechanical delays.

A significant problem with sorting queued commands is that the sorting process requires many computations. As the size of the queue to be sorted increases, so does the demand for processing power necessary to implement the sorting algorithm. Disc drives typically contain fairly inexpensive microprocessors to control functions of the system such as sorting and execution of commands from the host system. The typical microprocessors used are often incapable of sorting the queued commands fast enough. In order to minimize delays, the microprocessors must be capable of sorting the queued commands and finding the next optimal command to issue during the time that it takes the current command to execute. When many commands must be sorted, the time it takes to perform the sorting algorithm calculations required to determine the next optimal command can exceed the mechanical delays associated with execution of the current command. When this happens, a delay occurs between the completion of the current command and the start of the next command. The occurrence of this type of delay causes serious performance degradation of the disc drive.

The present invention provides a solution to this and other problems, and offers other advantages over the prior art.

SUMMARY OF THE INVENTION

The present invention relates to data storage systems and apparatus, such as disc drive data storage systems, in which commands to be executed are stored in one or more queues. In accordance with one embodiment of the invention, a data storage system and method of scheduling in the same are provided in which commands are stored in a command sort queue and a scheduled command queue. Commands in the command sort queue are sorted and assigned a priority. Eventually, commands in the command sort queue are transferred to the scheduled command queue. Commands in the scheduled command queue are executed without further sorting. The desired queue depth of the scheduled command queue is determined as a function of both the queue depth of the command sort queue and of a command execution rate value which is indicative of the rate at which commands in the scheduled command queue are executed.

These and various other features as well as advantages which characterize the present invention will be apparent upon reading of the following detailed description and review of the associated drawings.

DETAILED DESCRIPTION OF THE PREFERRED EMBODIMENTS

Figure 1:
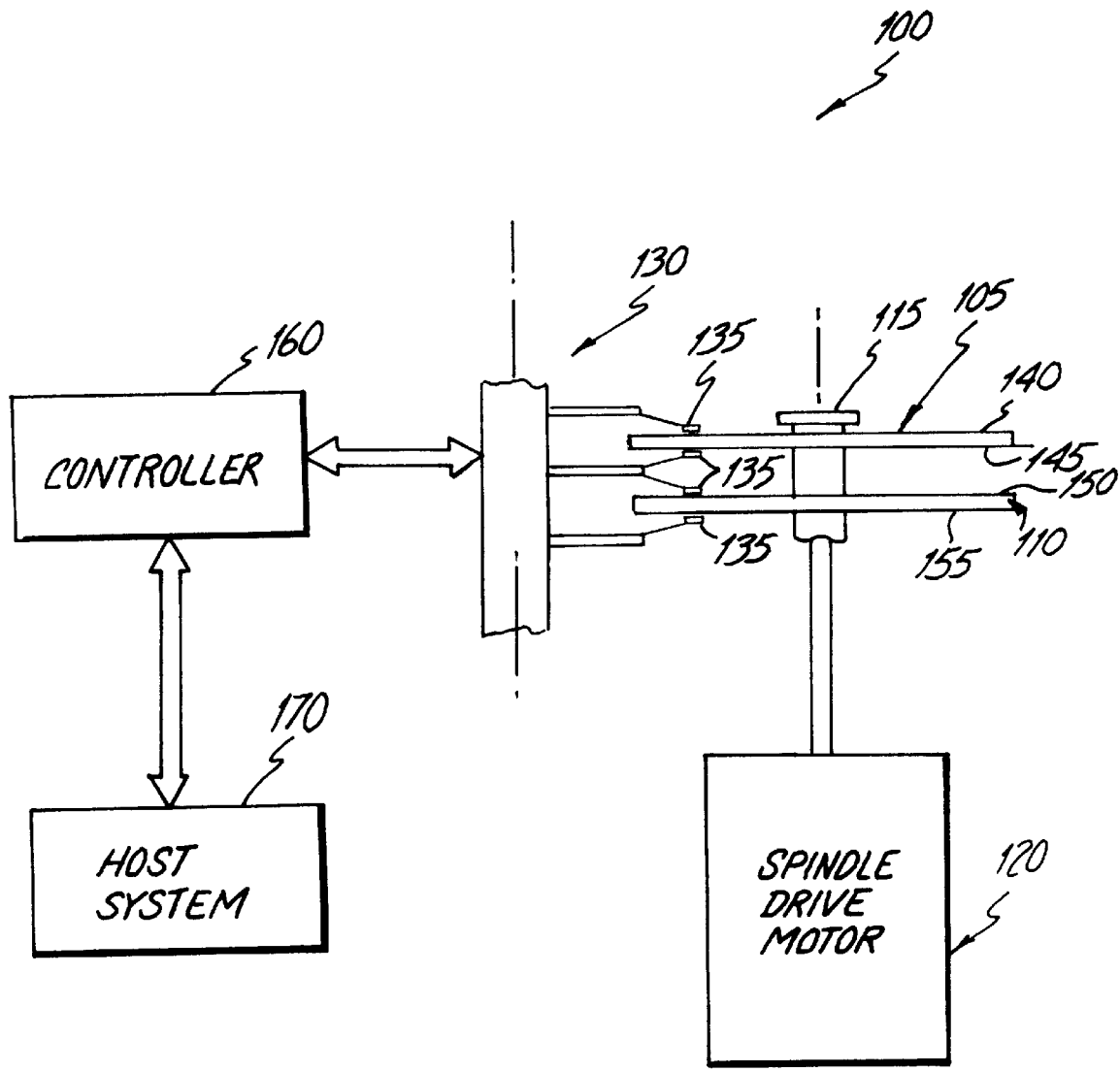
FIG. 1 is a block diagram of a data storage system adapted to implement preferred embodiment command scheduling methods of the present invention.

Referring now to FIG. 1, a data storage system adapted to implantment the present invention is shown. FIG. 1 is a diagrammatic illustration of disc drive data storage system 100 (disc drive 100) which includes controller 160 adapted to implement a command scheduling algorithm in accordance with preferred methods of the present invention. Controller 160 can include one or more microprocessors, programmable logic controllers, or other analog or digital control circuits. The controller 160 also includes means for scheduling, sorting queue commands, determining queue depth or size and determining the rate at which commands are executed. As illustrated, disc drive 100 includes discs 105 and 110 mounted on spindle 115. During rotation of spindle 115 and discs 105 and 110 by spindle drive motor 120, controller 160 controls movement of actuator assembly 130 to position data heads 135 over desired positions on disc surfaces 140, 145, 150 and 155. Depending upon which of disc surfaces 140, 145, 150 and 155 is to be written to or read from, a selected one of data heads 135 reads/writes data from/to the desired disc surface.

Controller 160 receives commands, such as read and write commands, from host system 170. Host system 170 can be, for example, a computer system in which disc drive 100 is installed as a data storage device. Controller 160 typically receives the commands from host system 170 faster than it can execute or implement the commands. Therefore, controller 160 stores commands in a command sort queue which can be sorted into an order which will minimize or reduce mechanical delays associated with execution of the commands. Any of a variety of sorting algorithms can be used to sort the commands in the command sort queue into an order that will minimize the total mechanical delays associated with the commands. For example, controller 160 could sort the commands in the command sort queue such that commands with the shortest response times are given higher priority. However, the present invention is not limited to a particular sorting algorithm or method used by controller 160 to sort the commands in the command sort queue.

If the ability of controller 160 to sort queued commands was not a limiting factor, the most efficient scheduling algorithm would sort all outstanding commands while executing the highest priority command. It is desirable to sort all queued commands because this will typically result in finding a command with a shorter access time. However, sorting all queued commands is often not feasible even with a microprocessor that is substantially more powerful than the ones used in most current disc drive controllers. For example, if a command with a very short access time is executed, there is considerably less time than average to sort the queued commands. These shorter access times can be an order of magnitude smaller than average access times. As a consequence, the capability to sort a large queue of commands within this short access time is well beyond the scope of most current disc drive controllers or microprocessors.

Controller 160 implements a scheduling algorithm to partially solve the problem by creating a second queue containing scheduled read and write commands. The queue of scheduled read and write commands contains a list of the next commands to be executed by the disc drive. This scheduled command queue is valuable for two reasons. First, any command that is already scheduled is no longer being sorted. This results in a smaller number of commands being sorted which leads to fewer calculations and manipulations required by controller 160. This in turn allows controller 160 to sort the commands as fast as the drive can mechanically execute them. Second, the scheduled command queue provides a buffer that prevents delays between queued commands. Frequently the disc drive will schedule one or more commands with a short access time. When a short access time occurs, the drive can mechanically execute it faster than controller 160 can provide another scheduled command to execute. However, assuming that enough commands have already been scheduled, then even after executing short access time command(s), additional commands are available in the scheduled queue for immediate execution.

Figure 2:
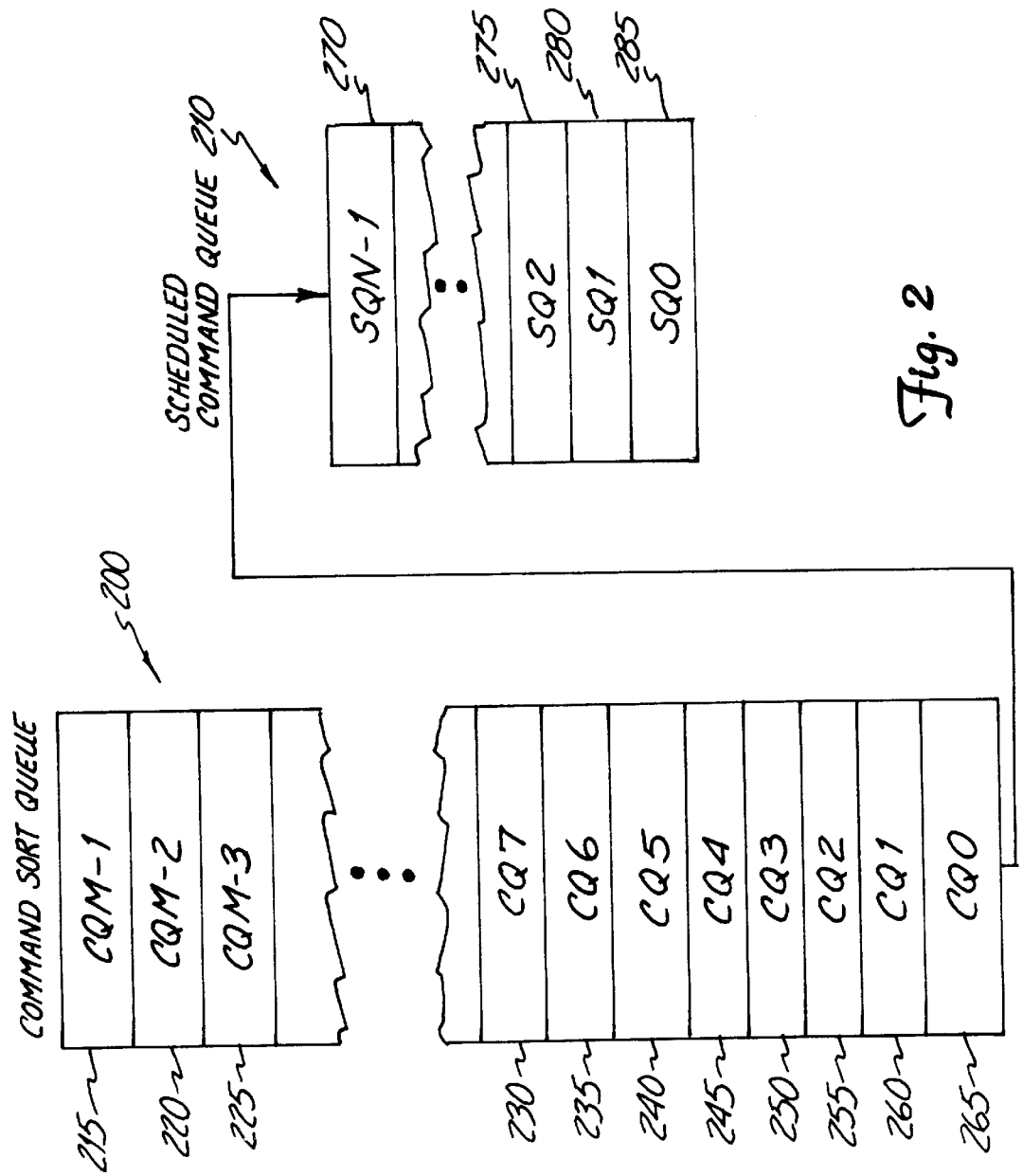
FIG. 2 is a diagrammatic view of a command sort queue and a scheduled command queue which are controlled using the methods of the present invention.

In accordance with preferred embodiments of the present invention, controller 160 stores unexecuted commands in the two separate queues, a command sort queue 200 (shown in FIG. 2) and a scheduled command queue 210 (shown in FIG. 2) are illustrated diagrammatically in FIG. 2. Command sort queue 200 has a variable number M of commands CQ0 through CQM-1 stored in an equivalent number of storage positions. As illustrated, commands CQM-1, CQM-2, CQM-3, ... CQ7, CQ6, CQ5, CQ4, CQ3, CQ2, CQ1, and CQ0 are stored in storage positions 215, 220, 225, ... 230, 235, 240, 245, 250, 255, 260 and 265, respectively. Scheduled command queue 210 has a dynamically determined number N of commands SQ0 through SQN-1 stored in an equivalent number of storage positions. As illustrated, commands SQN-1, ... SQ2, SQ1 and SQ0 are stored in storage positions 270, ... 275, 280 and 285, respectively.

Once controller 160 moves a command from command sort queue 200 to scheduled command queue 210, the command is executed in sequence without further sorting. For instance, a first-in-first-out (FIFO) scheduled command execution order can be implemented by controller 160 such that command SQ0 stored at memory location 285 is executed first, command SQ1 stored at memory location 280 is executed next, and so forth.

Based upon one or more commands in scheduled command queue 210, controller 160 repeatedly sorts the commands in command sort queue 200 to determine the next best command or commands to be placed in the scheduled command queue. After prioritization by the sorting process, the command or commands from command sort queue 200 determined to be the best for minimizing mechanical delays are transferred to scheduled command queue 210. Once transferred, the command or commands become the lowest priority commands in scheduled command queue 210, and are executed after all higher priority commands in that queue are completed.

In the example illustrated in FIG. 2, command CQ0 stored in memory location 265 has been determined to be the best command, or the command in command sort queue 200 having the highest priority, and will be transferred to scheduled command queue 210 as soon as a scheduled command is executed and one of the N positions in that queue are made available. However, if the sorting algorithm implemented by controller 160 identifies a new best command before a space becomes available in scheduled command queue 210, the new best command will be moved to queue 210 ahead of command CQ0. For instance, if the sorting algorithm determines that it will be more efficient to execute newly received command CQM-1 ahead of command CQ0, then command CQM-1 will be moved to memory location 265 or will be otherwise identified as the highest priority command in command sort queue 200. In this instance, command CQM-1 would be the next command transferred to scheduled command queue 210.

A problem which is solved by the scheduling algorithm implemented by controller 160 is the determination of the optimum size or queue depth N of scheduled command queue 210. According to the present invention, the optimum queue depth N of scheduled command queue 210 is not static. In general, as the number of commands queued in command sorting queue 200 increases, so does the queue depth N of scheduled command queue 210. The size of scheduled command queue 210 preferably grows to reduce the number of commands in queue 200 which must be sorted by controller 160. In addition to reducing a time and processing power required to sort queue 200, a larger scheduled command queue depth provides a buffer which prevents the occurrence of multiple short access time commands from consuming all scheduled commands prior to completion of the sorting process.

Although queue depth N of scheduled queue 210 is determined by controller 160 as a function of the depth M of queue 200, the optimum size of the scheduled command queue is preferably not based solely upon the number of commands in queue 200. Instead, queue depth N of scheduled queue 210 is preferably dynamically determined as a function of the rate at which commands in queue 210 are being executed. For instance, one set of 16 scheduled commands may be composed of read and write commands that access locations on the disc drive that are within very close proximity of each other. In addition, these commands may be requesting only a small amount of data. Contrast this situation with a set of queued read and write commands that access locations spanning the entire disc drive and that request large amounts of data. The latter set of queued commands will have mechanical delays that may be an order of magnitude larger than the former set of queued commands.

If the mechanical delays associated with a set of commands are longer, then a smaller scheduled command queue 210 depth N is better. The smaller scheduled command queue will still provide an adequate buffer to prevent delays between command execution and completion of the sorting.

Thus, the scheduled command queue 210 will not empty. At the same time, the smaller size of queue 210 results in a larger command set to be sorted, thereby facilitating a more efficiently ordered scheduled queue 210. If the mechanical delays are shorter, then a larger scheduled command queue depth N is preferred. The larger scheduled command queue prevents delays when short access time commands are being executed by preventing queue 210 from emptying and by decreasing queue 200 sort times.

The optimum size or queue depth N of scheduled command queue 210 is determined by controller 160 based upon the number of queued commands and the mechanical delays associated with the commands. The mechanical delays are dependent primarily on the degree of locality of the queued commands and the amount of data requested by the queued commands. The mechanical delays associated with queued commands can be measured indirectly. The number of commands completed per second is a good indication of mechanical delays. For instance, if the disc drive had executed 100 commands in the last second, then the drive was executing a command on average every 10 milliseconds. Measuring the number of commands completed per second informs the scheduling algorithm of the time it has to sort commands in queue 200 to prevent queue 210 from emptying. More specifically, it indicates to controller 160 how much time it had to sort the commands that were just completed instead of the time required to sort the next group of commands. This problem of past versus current command execution rates is alleviated by measuring the number of commands completed at regular short time intervals. The history provided by just completed command execution times is adequate as long as the time interval is short enough to react to changes in the nature of the queued commands. In general, any method of determining a command execution rate value indicative of the command execution rate can be used.

Controller 160 dynamically adjusts the size of scheduled command queue 210 using the number M of queued commands in command sort queue 200 and the command execution rate value or number of commands completed in the last time interval as inputs. The two inputs, command execution rate value and command sort queue depth M, can be readily converted to the optimum size N of the scheduled command queue 210. One technique is to simply use the two inputs as indices into a look-up table. The size of the necessary look-up table can be reduced by hashing or ranging the inputs. Other look-up techniques and computational techniques are possible.

Employing a scheduled queue of dynamic size significantly improves the performance of disc drive data storage system 100. The scheduled queue 210 allows controller 160 to sort as many commands as possible while minimizing delays between the execution of queued commands. Sorting more commands results in executing commands in an order that reduces more of the mechanical delays inherent in the disc drive. The reduction of mechanical delays, and the minimization of delays between executed commands due to the microprocessor's limited ability to sort commands, results in improved performance disc drives.

Figure 3:
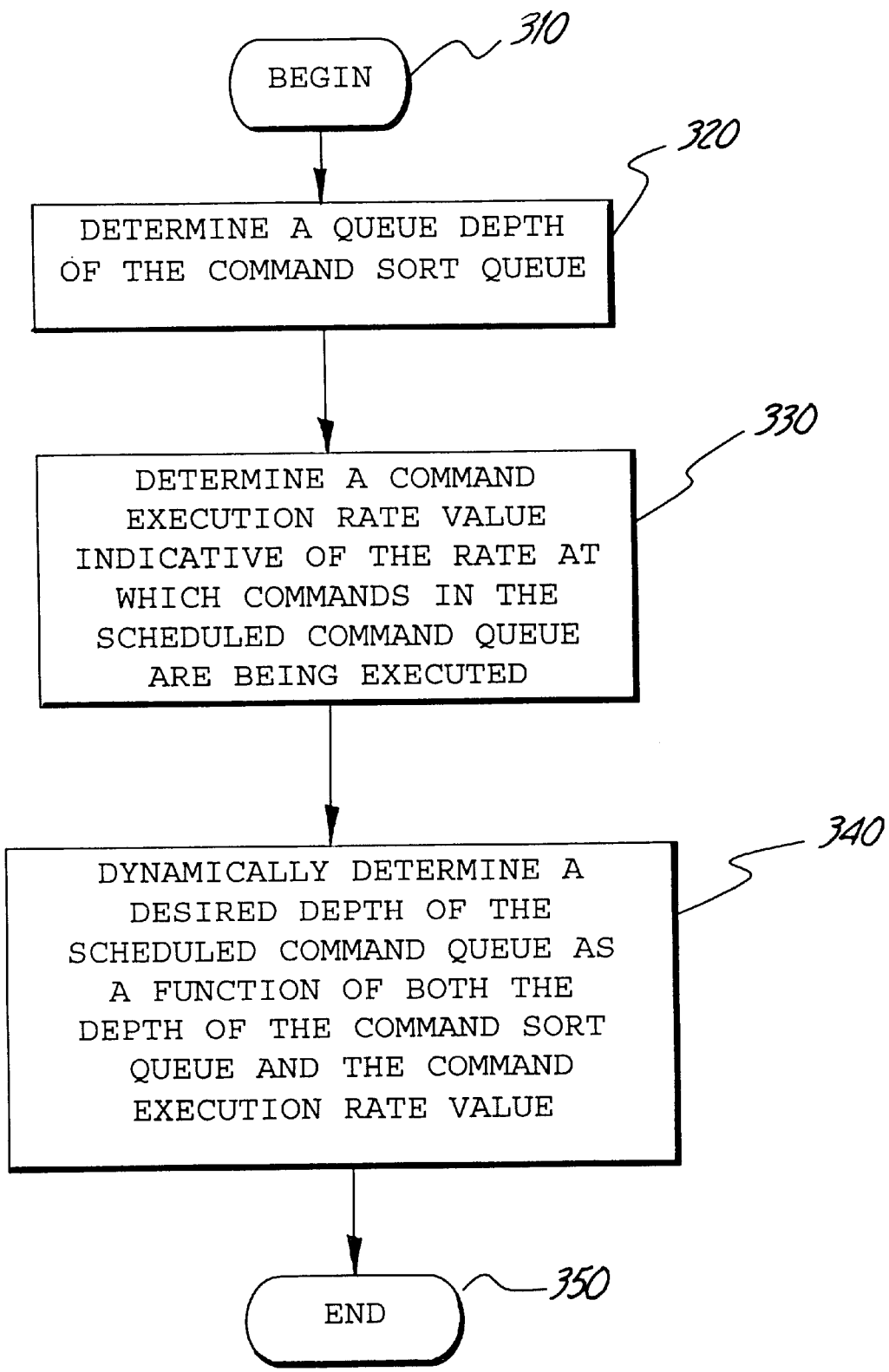
FIG. 3 is a flow diagram illustrating one preferred method of controlling the command sort queue and the scheduled command queue in accordance with the present invention.

FIG. 3 is a flow diagram illustrating preferred methods of the present invention discussed above. Beginning at step 310, a queue depth M of command sort queue 200 is determined at block 320. At block 330, a determination of the command execution rate value, indicative of the rate at which commands in scheduled command queue 210 are being executed, is determined. At block 340, a desired queue depth N of the scheduled command queue is determined as a function of both the queue depth M of the command sort queue and the command execution rate value. The method terminates at step 350. However, the dynamic scheduled command queue depth determination process illustrated in FIG. 3 can be repeated at predetermined time or command intervals.

The present invention can be summarized in reference to FIGS. 1–3 which illustrate the methods and data storage systems described above. As illustrated, controller 160 of disc drive data storage system 100 receives commands from host system 170 (see FIG. 1). The commands are initially stored in command sort queue 200 where they are sorted (see FIG. 2). A queue depth M of command sort queue 200 is indicative of a number of commands in the command sort queue. After sorting, selected commands are transferred to scheduled command queue 210 where they are executed as a function of a priority assigned to each command without further sorting. A queue depth N of scheduled command queue 210 is indicative of a number of commands in the scheduled command queue 210. Controller 160 is adapted to determine a desired queue depth N of the scheduled command queue 210 as a function of both the queue depth M of command sort queue 200 and a command execution rate value indicative of a rate at which commands in the scheduled command queue are executed.

In some embodiments, controller 160 determines the command execution rate value as a function of a number of commands from scheduled command queue 210 which have been executed during a previous predetermined time period. In some embodiments, controller 160 determines the desired queue depth N of scheduled command queue 210 by retrieving it from a look-up table using the queue depth M of command sort queue 200 and the determined command execution rate value as first and second inputs to the look-up table.

In preferred embodiments, the disc drive includes a disc surface 140 or other storage media on which data ois written to and read from during execution of the commands from the host system. In some embodiments, disc drive data storage system 100 is a small computer system interface (SCSI) disc drive.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts, within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is at times described as adisc drive data storage system, it will be appreciated by those skilled in the art that the teachings of the present invention can be applied to other systems and apparatuses, such as optical storage systems, without departing from the scope and spirit of the present invention.

What is claimed is:

1. A method of scheduling commands to be executed by a data storage system, the method comprising the steps of:

(a) determining a queue depth of a command sort queue, wherein all commands contained within the command sort queue are to be sorted and wherein a queue depth of the command sort queue is indicative of a number of commands in the command sort queue;

(b) determining a command execution rate value indicative of a rate at which commands in a scheduled command queue are executed;

(c) determining a desired queue depth of the scheduled command queue as a function of both the queue depth of the command sort queue and the command execution rate value, wherein a queue depth of the scheduled command queue is indicative of a number of commands in the scheduled command queue; and (d) executing commands in the scheduled command queue as a function of a priority assigned to each command in the scheduled command queue and without further sorting of the commands in the scheduled command queue.

2. The method of claim 1, further comprising before the determining step (a), a step (e) of receiving commands from a host system and storing the commands in the command sort queue.

3. The method of claim 1, wherein the determining step (b) comprises the steps of:

(b)(i) determining a number of commands from the scheduled command queue which have been executed during a predetermined time period; and (b)(ii) determining the command execution rate value as a function of the determined number of commands from the scheduled command queue which have been executed during the predetermined time period.

4. The method of claim 1, wherein the determining step (c) comprises a step (c) (i) of retrieving from a look-up table the desired queue depth of the scheduled command queue using the queue depth of the command sort queue and the determined command execution rate value as first and second inputs to the look-up table.

5. The method of claim 1, further comprising the steps of:

(e) sorting the command sort queue and assigning a priority to each command in the command sort queue; and (f) transferring the highest priority command in the command sort queue to the scheduled command queue, wherein once transferred the highest priority command from the command sort queue becomes the lowest priority command in the scheduled command queue.

6. The method of claim 5, further comprising a step (g) of repeating the transferring step (f) until the desired queue depth of the scheduled command queue is obtained.

7. A disc drive data storage system adapted to receive and execute commands from a host system, the disc drive data storage system comprising:

means for storing commands received from the host system and for sorting the stored commands in a command sort queue, wherein a queue depth of the command sort queue is indicative of a number of commands in the command sort queue;

means for storing commands to be executed in a scheduled command queue, wherein a queue depth of the scheduled command queue is indicative of a number of commands in the scheduled command queue, wherein commands in the scheduled command queue are executed as a function of a priority assigned to each command in the scheduled command queue without further sorting; and means for determining a desired queue depth of the scheduled command queue as a function of both the queue depth of the command sort queue and a command execution rate value indicative of a rate at which commands in the scheduled command queue are executed.

8. The disc drive data storage system of claim 7, wherein the desired queue depth of the scheduled command queue is retrieved from a look-up table using the queue depth of the command sort queue and the determined command execution rate value as first and second inputs to the look-up table.

9. The disc drive data storage system of claim 7, and further comprising:

means for determining the queue depth of the command sort queue; and means for determining the command execution rate value indicative of the rate at which commands in the scheduled command queue are executed.

10. The disc drive data storage system of claim 9, wherein the command execution rate value is determined as a function of a number of commands from the scheduled command queue which have been executed during a predetermined time period.

11. A data storage system comprising:

a host system which generates commands; and a disc drive comprising:

a storage media on which data is written to and read from during execution of the commands from the host system; and a controller operatively coupled to the host system and storing commands received from the host system initially in a command sort queue and subsequently in a scheduled command queue, wherein all commands stored in the command sort queue are to be sorted to determine a priority for transfer to the scheduled command queue, wherein commands in the scheduled command queue are executed by the controller as a function of a priority assigned to each command in the scheduled command queue without further sorting, and wherein the controller determines a desired queue depth of the scheduled command queue as a function of both a queue depth of the command sort queue and a command execution rate value indicative of a rate at which commands in the scheduled command queue are executed.

12. The data storage system of claim 11, wherein the controller determines the desired queue depth of the scheduled command queue by retrieving from a look-up table the desired queue depth of the scheduled command queue using the queue depth of the command sort queue and the command execution rate value as first and second inputs to the look-up table.

13. The data storage system of claim 11, wherein the disc drive is a small computer system interface (SCSI) disc drive.

14. The data storage system of claim 13, wherein the controller is adapted to determine the command execution rate value as a function of a number of commands from the scheduled command queue which have been executed during a predetermined time period.

15. The data storage system of claim 14, wherein while the highest priority command in the scheduled command queue is being executed, the controller sorts the command sort queue, assigns a priority to each command in the command sort queue, and transfers the highest priority command in the command sort queue to the scheduled command queue to maintain the queue depth of the scheduled command queue at the determined desired queue depth.

16. The data storage system of claim 15, wherein the highest priority command from the command sort queue becomes the lowest priority command in the scheduled command queue once transferred.

* * * * *

UNITED STATES PATENT AND TRADEMARK OFFICE
CERTIFICATE OF CORRECTION

PATENT NO. : 6,170,042 B1
DATED : January 2, 2001
INVENTOR(S) : Mark A. Gaertner et al.

It is certified that error appears in the above-identified patent and that said Letters Patent is hereby corrected as shown below:

<u>Title page,</u>
Item [56] References Cited insert:

-- U.S. PATENT DOCUMENTS
5,367,669 * 11/94 Holland et al. ......................... 714/7
5,455,934 * 10/95 Holland et al. ......................... 711/4
5,732,087 * 3/98 Lauer et al. ............................ 370/416
5,644,786 * 7/97 Gallagher et al. ...................... 710/30
5,664,143 * 9/97 Olbrich ................................. 711/112
5,787,482 * 7/98 Chen et al............................. 711/158 --

<u>Column 7,</u>
Line 17, after "comprising", insert -- , --.

Signed and Sealed this

Fourth Day of June, 2002

*Attest:*

*Attesting Officer*

JAMES E. ROGAN
*Director of the United States Patent and Trademark Office*